US011182023B2

(12) United States Patent
Ohlsson et al.

(10) Patent No.: US 11,182,023 B2
(45) Date of Patent: Nov. 23, 2021

(54) DYNAMIC TOUCH QUARANTINE FRAMES

(71) Applicant: FlatFrog Laboratories AB, Lund (SE)

(72) Inventors: Nicklas Ohlsson, Bunkeflostrand (SE);
Markus Andreasson, Lund (SE);
Tomas Christiansson, Torna Hällestad (SE); Andreas Björklund, Lund (SE);
Mats Peter Wallander, Lund (SE)

(73) Assignee: FlatFrog Laboratories AB, Lund (SE)

( * ) Notice: Subject to any disclaimer, the term of this patent is extended or adjusted under 35 U.S.C. 154(b) by 383 days.

(21) Appl. No.: 15/536,026

(22) PCT Filed: Jan. 28, 2016

(86) PCT No.: PCT/SE2016/050053
§ 371 (c)(1),
(2) Date: Jun. 14, 2017

(87) PCT Pub. No.: WO2016/122385
PCT Pub. Date: Aug. 4, 2016

(65) Prior Publication Data
US 2017/0344185 A1 Nov. 30, 2017

(30) Foreign Application Priority Data
Jan. 28, 2015 (SE) .................... 1550085-3

(51) Int. Cl.
*G06F 3/042* (2006.01)
*G06F 3/0488* (2013.01)
*G06F 3/041* (2006.01)

(52) U.S. Cl.
CPC .......... *G06F 3/0421* (2013.01); *G06F 3/0428* (2013.01); *G06F 3/04186* (2019.05); *G06F 3/04883* (2013.01); *G06F 2203/04109* (2013.01)

(58) Field of Classification Search
CPC ....... G06F 3/041–047; G06F 2203/041–04114
See application file for complete search history.

(56) References Cited

U.S. PATENT DOCUMENTS 3,440,426 A   4/1969   Bush
3,553,680 A   1/1971   Cooreman
(Continued)

FOREIGN PATENT DOCUMENTS

AU   2008 280 952 A1   3/2009
CN       201233592 Y   5/2009
(Continued)

OTHER PUBLICATIONS

Ahn, Y., et al., "A slim and wide multi-touch tabletop interface and its applications," BigComp2014, IEEE, 2014, in 6 pages.
(Continued)

*Primary Examiner* — Roberto W Flores
(74) *Attorney, Agent, or Firm* — Knobbe Martens Olson & Bear, LLP

(57) ABSTRACT

A touch system is described having a method of determining touch of one or more objects on a touch surface of a touch-sensitive apparatus, wherein the method operates in a time sequence of frames, each frame comprising the steps of: for a current frame, processing an output signal of the touch sensitive apparatus to generate one or more touch traces, each touch trace having one or more characteristics; and outputting a confirmed touch signal for each touch trace having a touch trace matching at least one of said one or more characteristics in a first number of frames preceding the current frame, wherein the first number of frames is determined in dependence on said one or more characteristics.

6 Claims, 14 Drawing Sheets

(56) References Cited

U.S. PATENT DOCUMENTS

| | | |
|---|---|---|
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,751,379 A | 6/1988 | Sasaki et al. |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,550 A | 9/1989 | Hiroaki et al. |
| 4,868,912 A | 9/1989 | Doering |
| 4,891,829 A | 1/1990 | Deckman et al. |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,515,083 A | 5/1996 | Casebolt et al. |
| 5,525,764 A | 6/1996 | Junkins et al. |
| 5,526,422 A | 6/1996 | Keen |
| 5,539,514 A | 7/1996 | Shishido et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,608,550 A | 3/1997 | Epstein et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,031,524 A | 2/2000 | Kunert |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,087,907 B1 | 8/2006 | Lalovic et al. |
| 7,133,031 B2 | 11/2006 | Wang et al. |
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,528,898 B2 | 5/2009 | Hashimoto |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,729,056 B2 | 6/2010 | Hwang et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |

(56) References Cited

U.S. PATENT DOCUMENTS

| | | |
|---|---|---|
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,001,086 B1 | 4/2015 | Saini |
| 9,024,896 B2 | 5/2015 | Chen |
| 9,024,916 B2 | 5/2015 | Christiansson |
| 9,035,909 B2 | 5/2015 | Christiansson |
| 9,063,614 B2 | 6/2015 | Petterson et al. |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,201,520 B2 | 12/2015 | Benko et al. |
| 9,207,800 B1 | 12/2015 | Eriksson et al. |
| 9,213,445 B2 | 12/2015 | King et al. |
| 9,274,645 B2 | 3/2016 | Christiansson et al. |
| 9,280,237 B2 | 3/2016 | Kukulj |
| 9,317,146 B1 | 4/2016 | Hufnagel |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,874,978 B2 | 1/2018 | Wall |
| 10,013,107 B2 | 7/2018 | Christiansson et al. |
| 10,019,113 B2 | 7/2018 | Christiansson et al. |
| 10,282,035 B2 | 5/2019 | Kocovksi et al. |
| 10,649,585 B1 | 5/2020 | van Beek et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |

(56) References Cited

U.S. PATENT DOCUMENTS

| | | |
|---|---|---|
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0080811 A1 | 4/2008 | Deane |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0133265 A1 | 6/2008 | Silkaitis et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0000831 A1 | 1/2009 | Miller et al. |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0080361 A1 | 4/2011 | Miller et al. |
| 2011/0084939 A1 | 4/2011 | Gepner et al. |
| 2011/0090176 A1 | 4/2011 | Christiansson et al. |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0205189 A1 | 8/2011 | Newton |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0056807 A1 | 3/2012 | Chapman et al. |
| 2012/0062474 A1 | 3/2012 | Weishaupt et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |

(56) References Cited

U.S. PATENT DOCUMENTS

| | | |
|---|---|---|
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0170056 A1 | 7/2012 | Jakobsen et al. |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0212457 A1 | 8/2012 | Drumm |
| 2012/0217882 A1 | 8/2012 | Wong et al. |
| 2012/0218229 A1 | 8/2012 | Drumm |
| 2012/0223916 A1 | 9/2012 | Kukulj |
| 2012/0242622 A1 | 9/2012 | Tseng et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2012/0313865 A1 | 12/2012 | Pearce |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0141395 A1 | 6/2013 | Holmgren et al. |
| 2013/0154983 A1 | 6/2013 | Christiansson et al. |
| 2013/0155027 A1 | 6/2013 | Holmgren et al. |
| 2013/0155655 A1 | 6/2013 | Lee et al. |
| 2013/0158504 A1 | 6/2013 | Ruchti et al. |
| 2013/0181896 A1 | 7/2013 | Gruhlke et al. |
| 2013/0181953 A1 | 7/2013 | Hinckley et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |
| 2013/0234991 A1 | 9/2013 | Sparf |
| 2013/0241887 A1 | 9/2013 | Sharma |
| 2013/0249833 A1 | 9/2013 | Christiansson et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300714 A1 | 11/2013 | Goh et al. |
| 2013/0300716 A1 | 11/2013 | Craven-Bartle et al. |
| 2013/0307795 A1 | 11/2013 | Suarez Rovere |
| 2013/0321740 A1 | 12/2013 | An et al. |
| 2013/0328790 A1* | 12/2013 | Liu ................. G06F 3/0418 345/173 |
| 2013/0342490 A1 | 12/2013 | Wallander et al. |
| 2014/0002400 A1 | 1/2014 | Christiansson et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0139467 A1 | 5/2014 | Ghosh et al. |
| 2014/0152624 A1 | 6/2014 | Piot et al. |
| 2014/0160762 A1 | 6/2014 | Dudik et al. |
| 2014/0192023 A1 | 7/2014 | Hoffman |
| 2014/0226084 A1 | 8/2014 | Utukuri et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0009687 A1 | 1/2015 | Lin |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0121691 A1 | 5/2015 | Wang |
| 2015/0130769 A1 | 5/2015 | Björklund |
| 2015/0131010 A1 | 5/2015 | Sugiyama |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0199071 A1 | 7/2015 | Hou |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0261323 A1 | 9/2015 | Cui et al. |
| 2015/0271481 A1 | 9/2015 | Guthrie et al. |
| 2015/0286698 A1 | 10/2015 | Gagnier et al. |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0339000 A1 | 11/2015 | Lee et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2015/0373864 A1 | 12/2015 | Jung |
| 2016/0004898 A1 | 1/2016 | Holz |
| 2016/0026297 A1 | 1/2016 | Shinkai et al. |
| 2016/0026337 A1 | 1/2016 | Wassvik et al. |
| 2016/0034099 A1 | 2/2016 | Christiansson et al. |
| 2016/0041629 A1 | 2/2016 | Rao et al. |
| 2016/0050746 A1 | 2/2016 | Wassvik et al. |
| 2016/0062549 A1 | 3/2016 | Drumm et al. |
| 2016/0070415 A1 | 3/2016 | Christiansson et al. |
| 2016/0070416 A1 | 3/2016 | Wassvik |
| 2016/0092021 A1 | 3/2016 | Tu et al. |
| 2016/0103026 A1 | 4/2016 | Povazay et al. |
| 2016/0117019 A1 | 4/2016 | Michiaki |
| 2016/0124546 A1 | 5/2016 | Chen et al. |
| 2016/0124551 A1 | 5/2016 | Christiansson et al. |
| 2016/0077616 A1 | 6/2016 | Durojaiye et al. |
| 2016/0154531 A1 | 6/2016 | Wall |
| 2016/0154532 A1 | 6/2016 | Campbell |
| 2016/0154533 A1 | 6/2016 | Eriksson et al. |
| 2016/0179261 A1 | 6/2016 | Drumm |
| 2016/0202841 A1 | 7/2016 | Christiansson et al. |
| 2016/0209886 A1 | 7/2016 | Suh et al. |
| 2016/0216844 A1 | 7/2016 | Bergström |

(56) References Cited

U.S. PATENT DOCUMENTS

| | | |
|---|---|---|
| 2016/0224144 A1 | 8/2016 | Klinghult et al. |
| 2016/0255713 A1 | 9/2016 | Kim et al. |
| 2016/0295711 A1 | 10/2016 | Ryu et al. |
| 2016/0299583 A1 | 10/2016 | Watanabe |
| 2016/0299593 A1 | 10/2016 | Christiansson et al. |
| 2016/0306501 A1 | 10/2016 | Drumm et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0031516 A1 | 2/2017 | Sugiyama et al. |
| 2017/0075484 A1 | 3/2017 | Kali et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0115823 A1 | 4/2017 | Huang et al. |
| 2017/0139541 A1 | 5/2017 | Christiansson et al. |
| 2017/0160871 A1 | 6/2017 | Drumm |
| 2017/0177163 A1 | 6/2017 | Wallander et al. |
| 2017/0185230 A1 | 6/2017 | Wallander et al. |
| 2017/0220204 A1 | 8/2017 | Huang et al. |
| 2017/0277355 A1* | 9/2017 | Kang ................ G06F 3/04186 |
| 2017/0293392 A1 | 10/2017 | Christiansson et al. |
| 2017/0344185 A1 | 11/2017 | Ohlsson et al. |
| 2018/0031753 A1 | 2/2018 | Craven-Bartle et al. |
| 2018/0107373 A1 | 4/2018 | Cheng |
| 2018/0129354 A1 | 5/2018 | Christiansson et al. |
| 2018/0136788 A1 | 5/2018 | He et al. |
| 2018/0149792 A1 | 5/2018 | Lee et al. |
| 2018/0210572 A1 | 7/2018 | Wallander et al. |
| 2018/0225006 A1 | 8/2018 | Wall |
| 2018/0253187 A1 | 9/2018 | Christiansson et al. |
| 2018/0267672 A1 | 9/2018 | Wassvik et al. |
| 2018/0275788 A1 | 9/2018 | Christiansson et al. |
| 2018/0275830 A1 | 9/2018 | Christiansson et al. |
| 2018/0275831 A1 | 9/2018 | Christiansson et al. |
| 2018/0314206 A1 | 11/2018 | Lee et al. |
| 2019/0004668 A1 | 1/2019 | Jeong et al. |
| 2019/0025984 A1 | 1/2019 | Weilbacher et al. |
| 2019/0050074 A1 | 2/2019 | Kocovski |
| 2019/0107923 A1 | 4/2019 | Drumm |
| 2019/0146630 A1 | 5/2019 | Chen et al. |
| 2019/0196658 A1 | 6/2019 | Skagmo et al. |
| 2019/0196659 A1 | 6/2019 | Skagmo et al. |
| 2019/0227670 A1 | 7/2019 | O'Cleirigh et al. |
| 2019/0235701 A1 | 8/2019 | Han et al. |
| 2019/0258353 A1 | 8/2019 | Drumm et al. |
| 2019/0196657 A1 | 10/2019 | Skagmo et al. |
| 2019/0324570 A1 | 10/2019 | Kolundzjia et al. |
| 2019/0377431 A1 | 12/2019 | Drumm |
| 2019/0377435 A1 | 12/2019 | Piot et al. |
| 2020/0012408 A1 | 1/2020 | Drumm et al. |
| 2020/0073509 A1 | 3/2020 | Shih et al. |
| 2020/0098147 A1 | 3/2020 | Ha et al. |
| 2020/0125189 A1 | 4/2020 | Kim et al. |
| 2020/0159382 A1 | 5/2020 | Drumm |
| 2020/0167033 A1 | 5/2020 | Kim et al. |
| 2020/0249777 A1 | 8/2020 | Hou et al. |
| 2020/0310621 A1 | 10/2020 | Piot et al. |
| 2020/0341587 A1 | 10/2020 | Drumm |
| 2020/0348473 A1 | 11/2020 | Drumm |
| 2020/0387237 A1 | 12/2020 | Drumm |

FOREIGN PATENT DOCUMENTS

| | | |
|---|---|---|
| CN | 101174191 A | 6/2009 |
| CN | 101644854 A | 2/2010 |
| CN | 201437963 U | 4/2010 |
| CN | 201465071 U | 5/2010 |
| CN | 101882034 | 11/2010 |
| CN | 101019071 B | 6/2012 |
| CN | 101206550 B | 6/2012 |
| CN | 103123556 A | 5/2013 |
| CN | 203189466 U | 9/2013 |
| CN | 203224848 U | 10/2013 |
| CN | 203453994 U | 2/2014 |
| CN | 101075168 B | 4/2014 |
| CN | 205015574 U | 2/2016 |
| CN | 205384833 U | 7/2016 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0845812 B1 | 6/1998 |
| EP | 0600576 B1 | 10/1998 |
| EP | 0931731 A1 | 7/1999 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2325735 A2 | 5/2011 |
| EP | 2339437 A3 | 10/2011 |
| EP | 2442180 A1 | 4/2012 |
| EP | 2466429 A1 | 6/2012 |
| EP | 2479642 A1 | 7/2012 |
| EP | 1457870 B1 | 8/2012 |
| EP | 2565770 A2 | 3/2013 |
| EP | 2765622 A2 | 8/2014 |
| EP | 2778849 A1 | 9/2014 |
| EP | 2515216 A1 | 3/2016 |
| EP | 3535640 A1 | 9/2019 |
| FR | 2172828 A | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | S62159213 A | 7/1987 |
| JP | H05190066 A | 7/1993 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/127867 A1 | 4/2001 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/032210 A2 | 4/2004 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |
| WO | WO 2008/034184 A1 | 3/2008 |
| WO | WO 2008/039006 A1 | 4/2008 |
| WO | WO 2008/068607 A2 | 6/2008 |

(56) References Cited

FOREIGN PATENT DOCUMENTS

| | | |
|---|---|---|
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/018176 A2 | 2/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/172302 A1 | 12/2012 |
| WO | WO 2012/176801 A1 | 12/2012 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |
| WO | WO 2013/11571 A2 | 8/2013 |
| WO | WO 2013/133756 A1 | 9/2013 |
| WO | WO 2013/133757 A2 | 9/2013 |
| WO | WO 2013/159472 | 10/2013 |
| WO | WO 2013/176613 A2 | 11/2013 |
| WO | WO 2013/176614 A2 | 11/2013 |
| WO | WO 2013/176615 A2 | 11/2013 |
| WO | WO 2014/044181 A1 | 3/2014 |
| WO | WO 2014/055809 A1 | 4/2014 |
| WO | WO 2014/065601 | 5/2014 |
| WO | WO 2014/086084 A1 | 6/2014 |
| WO | WO 2014/098744 A1 | 6/2014 |
| WO | WO 2014/104967 A1 | 7/2014 |
| WO | WO 2015/123322 A1 | 8/2015 |
| WO | WO 2015/175586 A1 | 11/2015 |
| WO | WO 2016/130074 A1 | 8/2016 |
| WO | WO 2018/096430 A1 | 5/2018 |
| WO | WO 2018/106172 A1 | 6/2018 |
| WO | WO 2018/106176 | 6/2018 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.
Fihn, M., "Touch Panel—Special Edition," Veritas et Visus, Nov. 2011, in 1 page.
Fourmont, K., "Non-Equispaced Fast Fourier Transforms with Applications to Tomography," Journal of Fourier Analysis and Applications, vol. 9, Issue 5, 2003, in 20 pages.
Iizuka, K., "Boundaries, Near-Field Optics, and Near-Field Imaging," Elements of Photonics, vol. 1: In Free Space and Special Media, Wiley & Sons, 2002, in 57 pages.
Johnson, M., "Enhanced Optical Touch Input Panel", IBM Technical Discolusre Bulletin, 1985, in 3 pages.
Kak, et al., "Principles of Computerized Tomographic Imaging", Institute of Electrical Engineers, Inc., 1999, in 333 pages.
The Laser Wall, MIT, 1997, http://web.media.mit.edu/~joep/SpectrumWeb/captions/Laser.html.
Liu, J., et al. "Multiple touch points identifying method, involves starting touch screen, driving specific emission tube, and computing and transmitting coordinate of touch points to computer system by direct lines through interface of touch screen," 2007, in 25 pages.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Tedaldi, M., et al. "Refractive index mapping of layered samples using optical coherence refractometry," Proceedings of SPIE, vol. 7171, 2009, in 8 pages.
International Search Report for International App. No. PCT/SE2017/050102, dated Apr. 5, 2017, in 4 pages.
Supplementary European Search Report for European App. No. EP 16759213, dated Oct. 4, 2018, in 9 pages.
Extended European Search Report for European App. No. 16743795.3, dated Sep. 11, 2018, in 5 pages.
International Search Report for International App. No. PCT/SE2017/051224, dated Feb. 23, 2018, in 5 pages.
International Search Report for International App. No. PCT/IB2017/057201, dated Mar. 6, 2018, in 4 pages.
Extended European Search Report in European Application No. 19165019.1, dated Jul. 18, 2019 in 8 pages.
International Preliminary Report on Patentability received in International Application No. PCT/SE2017/051233, dated Jun. 11, 2019, in 6 pages.
International Search Report for International App. No. PCT/SE2018/050070, dated Apr. 25, 2018, in 4 pages.
Extended European Search Report in European Application No. 17750516.1, dated Jul. 16, 2019 in 5 pages.
Extended European Search Report in European Application No. 16873465.5, dated Jun. 25, 2019 in 9 pages.
Extended European Search Report for European App. No. 18772370.5, dated Dec. 9, 2020, in 8 pages.
Extended European Search Report for European App. No. 18772178.2, dated Dec. 10, 2020, in 8 pages.
Extended European Search Report for European App. No. 18774232.5, dated Dec. 21, 2020, in 9 pages.

\* cited by examiner

Trace Properties

| TraceID |
|---|
| • Trace_Age<br>• Confirmed<br>• Signal_Strength<br>• Location<br>• Area<br>• Speed<br>• Direction<br>• Gesture |

Fig. 3a

Global Properties

| GlobalProp |
|---|
| • Number_Of_confirmed traces<br>• Number_Of_traces<br>• Global_Noise |

Fig. 3b

0 Quarantine Frames

|         | Touch (1) | Touch (2) | Touch (3) | Touch (4) | Touch (5) |
|---------|-----------|-----------|-----------|-----------|-----------|
| Frame 1 | Yes       |           |           |           |           |
| Frame 2 |           | Yes       | Yes       |           |           |
| Frame 3 |           | Yes       |           |           |           |
| Frame 4 |           | Yes       |           | Yes       |           |
| Frame 5 |           | Yes       |           | Yes       |           |
| Frame 6 |           | Yes       |           |           | Yes       |

1 Quarantine Frames

|         | Touch (1) | Touch (2) | Touch (3) | Touch (4) | Touch (5) |
|---------|-----------|-----------|-----------|-----------|-----------|
| Frame 1 |           |           |           |           |           |
| Frame 2 |           |           |           |           |           |
| Frame 3 |           | Yes       |           |           |           |
| Frame 4 |           | Yes       |           |           |           |
| Frame 5 |           | Yes       |           | Yes       |           |
| Frame 6 |           | Yes       |           |           |           |

2 Quarantine Frames

|         | Touch (1) | Touch (2) | Touch (3) | Touch (4) | Touch (5) |
|---------|-----------|-----------|-----------|-----------|-----------|
| Frame 1 |           |           |           |           |           |
| Frame 2 |           |           |           |           |           |
| Frame 3 |           |           |           |           |           |
| Frame 4 |           | Yes       |           |           |           |
| Frame 5 |           | Yes       |           |           |           |
| Frame 6 |           | Yes       |           |           |           |

3 Quarantine Frames

|         | Touch (1) | Touch (2) | Touch (3) | Touch (4) | Touch (5) |
|---------|-----------|-----------|-----------|-----------|-----------|
| Frame 1 |           |           |           |           |           |
| Frame 2 |           |           |           |           |           |
| Frame 3 |           |           |           |           |           |
| Frame 4 |           |           |           |           |           |
| Frame 5 |           | Yes       |           |           |           |
| Frame 6 |           | Yes       |           |           |           |

Fig. 5

DYNAMIC TOUCH QUARANTINE FRAMES

CROSS-REFERENCE TO RELATED APPLICATIONS

This application claims the benefit and priority to and is a U.S. National Phase of PCT International Application No. PCT/SE2016/050053, filed on Jan. 28, 2016. This application claims the benefit and priority to Swedish Patent Application No. 1550085-3, filed Jan. 28, 2015. The disclosure of the above-referenced applications are hereby expressly incorporated by reference in their entirety.

TECHNICAL FIELD

The present invention generally relates to improved touch determination on touch surfaces of optical touch-sensing systems, and in particular in relation to FTIR-based (frustrated total internal reflection) touch systems.

BACKGROUND ART

Touch Sensing Systems

Touch-sensing systems ("touch systems") are in widespread use in a variety of applications. Typically, the touch systems are actuated by a touching object such as a finger or stylus, either in direct contact, or through proximity (i.e. without contact), with a touch surface. Touch systems may be used as touch pads in laptop computers, equipment control panels, and as overlays on displays e.g. hand held devices, such as mobile telephones. A touch panel that is overlaid on or integrated in a display is also denoted a "touch screen". Many other applications are known in the art.

Types of Touch

There are numerous known techniques for providing touch sensitivity, e.g. by incorporating resistive wire grids, capacitive sensors, strain gauges, etc into a touch panel. There are also various types of optical touch systems, which e.g. detect shadows cast by touching objects onto a touch surface, or detect light scattered off the point(s) of touching objects on a touch panel.

FTIR

One specific type of optical touch system uses projection measurements of light that propagates on a plurality of propagation paths inside a light transmissive panel. The projection measurements thus quantify a property, e.g. power, of the light on the individual propagation paths, when the light has passed the panel. For touch detection, the projection measurements may be processed by simple triangulation, or by more advanced image reconstruction techniques that generate a two-dimensional distribution of disturbances on the touch surface, i.e. an "image" of everything on the touch surface that affects the measured property. The light propagates by total internal reflection (TIR) inside the panel such that a touching object causes the propagating light on one or more propagation paths to be attenuated by so-called frustrated total internal reflection (FTIR). Hence, this type of system is an FTIR-based projection-type touch system. Examples of such touch systems are found in U.S. Pat. Nos. 3,673,327, 4,254,333, 6,972,753, US2004/0252091, US2006/0114237, US2007/0075648, WO2009/048365, US2009/0153519, WO2010/006882, WO2010/064983, and WO2010/134865.

False Touches

One potential problem with any type of touch screen system is the occurrence of 'false-positive' or 'ghost' touches. These occur when a touch is detected by the system when or where no touch actually occurred. In order to keep the occurrence of false-positive touches to a minimum, a filter in the form of a signal to noise threshold is applied to a touch detection signal. The signal to noise threshold is set to a high enough value to keep the probability of false-positive touches caused by noise to an acceptably low level. However, this makes the detection of real touches more difficult and can lead to the system missing real but light touches from the user. The alternative is to design the system to have low noise but this can require expensive materials and manufacturing techniques to implement.

Quarantine Frames

One technique which allows the touch threshold to be reduced while still keeping the probability of false-positive touches low is to require that a touch must be detected in two or more consecutive detection frames. PCT publication WO2012/002894 describes a system which can be configured to output touch data for touches that are matched to traces of at least a certain age. The frames in which a touch trace (or touch trace) is detected but no confirmed touch is yet output by the system are called 'quarantine frames' and the touch trace is not output as a confirmed touch until it has been recorded in a fixed number of quarantine frames. This technique can be effective for reducing false-positive touches, since the probability of a false-positive touch caused by noise persisting across all the quarantine frames is significantly less than the probability of the occurrence of a false-positive touch in a single frame.

Latency

One problem with this technique is that it can significantly increase latency of a detected real touch. If each frame is 15 ms in length, and the number of quarantine frames used is ten, then a delay of 135 ms or more may occur before a real touch is confirmed and output by the touch system.

Therefore, what is needed is a method of detecting touches without the use of a high signal to noise threshold or an expensive low-noise system. The system should be able to balance the need to detect light touches with the wish to have a responsive low-latency system without the occurrence of false positive touches due to noise.

SUMMARY OF INVENTION

It is an objective of the invention to at least partly overcome one or more of the above-identified limitations of the prior art.

One or more of these objectives, as well as further objectives that may appear from the description below, are at least partly achieved by means of a method for data processing, a computer readable medium, devices for data processing, and a touch-sensing apparatus according to the independent claims, embodiments thereof being defined by the dependent claims.

A method of detecting touches is needed which operates without the use of a high signal to noise threshold or an expensive low-noise system. The method should be able to balance the need to have a low touch threshold for light touches without compromising on the frequency of false positive touches due to noise. Finally, the method should ensure that the touch latency (i.e. the time between the initial detection of a touch trace and the output of a confirmed touch) is always as low as possible.

A first aspect of the invention is a method of determining touch of one or more objects on a touch surface of a touch-sensitive apparatus. The method operates in a time sequence of frames, each frame comprising the steps of:

1. Processing an output signal of the touch sensitive apparatus during the current frame to generate one or more touch traces (or touch candidates). Each of the touch traces has one or more characteristics. E.g. attenuation value, location, size, etc.
2. Output a touch determination signal for each touch trace having a touch trace matching at least one of said one or more characteristics in each of a first number of frames preceding the current frame. I.e. once a touch trace is identified, the method reviews a set number of frames (known as quarantine frames) previous to the present frame to determine if a corresponding trace touch exists in each of them. If a corresponding touch trace with matching characteristics is identified in each of the previous frames, a touch determination signal is output for the touch trace in the present frame. In this aspect, the first number of frames is determined in dependence on said one or more characteristics of the trace.

Consequently, this aspect describes a method of varying the number of quarantine frames that are reviewed previous to the present frame to determine if a corresponding trace touch exists in each of them. If a corresponding trace touch does not exist in each of the set number of previous frames then the touch trace is assumed to be either noise or an as-yet-unconfirmed touch. This way, the previous frames are effectively quarantine frames. If a corresponding trace touch does exist in each of the set number of previous frames then a touch determination signal is output for the touch trace in the present frame. I.e. if a touch signal has persisted through the quarantine frames, then it is output as a confirmed touch. By making the number of quarantine frames dependent on the characteristics of the touch trace of the present frame, a significant advantage is gained. The conditions under which false positive touches may occur can vary and so it is advantageous to use information provided on the characteristics of the touch trace in the present frame to determine the number of quarantine frames.

In one embodiment, the said one or more characteristics may comprise a touch trace signal strength. This allows the number of quarantine frames to be adjusted in dependence on the measured signal strength of the touch trace, as signal strength is usually a good indicator of the probability of a confirmed touch. In one embodiment, the touch trace signal strength may correspond to a touch trace pressure where the first number of frames is inversely proportional to the touch trace pressure. This provides the advantage of reducing the number of quarantine frame and, consequently, the latency of the confirmed touch, when the signal strength of the touch trace is high. In one embodiment, the first number of frames is zero when the touch trace pressure is at a maximum value. This effectively eliminates confirmed touch latency altogether when the signal strength is so high that it is very unlikely to represent a false touch.

In another embodiment, the touch trace signal strength corresponds to a touch trace area. This provides the advantages of reducing the latency for large touches which are unlikely to represent false touches. Alternatively, very large touches (i.e. palm presses) may be given a large number of quarantine frames to ensure they are not accidental.

In another embodiment, the one or more characteristics of the touch trace may comprise a location of the touch trace on the touch surface. This provides the advantage that the number of quarantine frames used can be varied depending on the location of the touch trace on the touch surface. In areas more susceptible to noise, the number of quarantine frames can be increased to ensure that no false positive are confirmed as confirmed touches. In one embodiment, the first number of frames is greatest at the edges of the touch surface and lowest at the centre of the touch surface. This reduces false positives for systems having high noise around the perimeter of the touch surface (e.g. FTIR touch systems). In an alternative embodiment, the first number of quarantine frames for a touch trace is lower at the edges of the touch surface and greater at the centre of the touch surface. This reduces false positives for systems having high noise around the centre of the touch surface (e.g. projected capacitance systems). In one embodiment, the touch surface is divided into zones which correspond to a predetermined number of quarantine frames.

In another embodiment, the first number of quarantine frames is increased when the touch trace is close to an existing confirmed touch or other touch traces in the present frame. Existing touches can add a degree of signal noise to touch systems, especially in their vicinity on the touch surface. It is therefore advantageous to allow the number of quarantine frames to be dependent on the number of existing touches or touch traces local to the touch trace in question. When the touch trace is relatively isolated, the number of quarantine frames can be reduced to improve touch latency.

In an embodiment similar to the previous frame, said one or more characteristics may comprise a total number of confirmed touches and/or touch traces in the current frame. As stated above, a large number of touches on the touch surface may increase the amount of noise in the touch system and so it is advantageous to set the number of quarantine frames in dependence on the number of overall touches. In one embodiment, the first number of frames is proportional to the total number of touch traces in the current frame, reducing the number of false positives when there is increased noise in the signal from a large number of touches.

In another embodiment, said one or more characteristics may comprise a direction and/or speed of the touch trace, wherein the direction and/or speed is determined in dependence on preceding frames containing a touch trace matching at least one of said one or more characteristics of the current frame. The speed and direction of the trace touch can be determined from the distance and direction that the trace touch has moved from trace touches in preceding frames matching the characteristics of the present trace touch. This provides the advantage of allowing the number of quarantine frames to be reduced or increased for certain gestures and swipes, such as an edge swipe where the latency needs to be kept to a minimum. In one embodiment, the first number of frames is proportional to the speed of the touch trace. This prevents a collection of false touches to appear as a fast moving finger swipe. In one embodiment, the first number of frames is proportional to the direction of the touch trace. This can be advantageous where a finger swipe in a particular direction requires a reduced latency. In one embodiment, said one or more characteristics may comprise a gesture type, wherein the gesture type corresponds to a gesture at least partly comprising the touch trace of the current frame and one or more touch traces of preceding frames. In one embodiment, the first number of frames is determined in dependence on the gesture type. In one embodiment, the first number of frames is increased for a gesture type corresponding to a gesture beginning outside of an active area of the touch surface. This would advantageously allow a reduction of false positives in an area of the touch surface more susceptible to noise.

In one embodiment of the invention, one or more characteristics may comprise a noise value, wherein the noise value corresponds to a determined background and/or local electrical and/or optical noise. In a particular embodiment, the first number of frames is increased in proportion to the noise value. This advantageously allows the number of quarantine frames to be increased when either general background noise is increased or when noise local to the trace touch is determined to be above a threshold value.

A second aspect of the invention comprises computer readable medium comprising computer instructions which, when executed by a data-processing system, are configured to carry out the method of any preceding embodiment.

A third aspect of the invention comprises a system for determining touch of one or more objects on a touch surface, the system being configured to operate in a time sequence of frames, the system comprising: a touch-sensitive apparatus comprising a touch surface, a processing unit configured to: for a current frame, processing an output signal of the touch sensitive apparatus to generate one or more touch traces, each touch trace having one or more characteristics; and outputting a touch determination signal for each touch trace having a preceding touch trace matching at least one of said one or more characteristics in a first number of frames preceding the current frame, wherein the first number of frames is determined in dependence on said one or more characteristics.

Any one of the above-identified embodiments of the first aspect may be adapted and implemented as an embodiment of the second to third aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 2 is a flowchart of a touch data extraction process in the system of FIG. 1a.

FIG. 3a and FIG. 3b are tables showing Trace properties and Global panel properties.

FIG. 5 is a table showing the effect of different numbers of quarantine frames on a confirmed touch output signal.

DESCRIPTION OF EMBODIMENTS

Terms

Figure 1A:
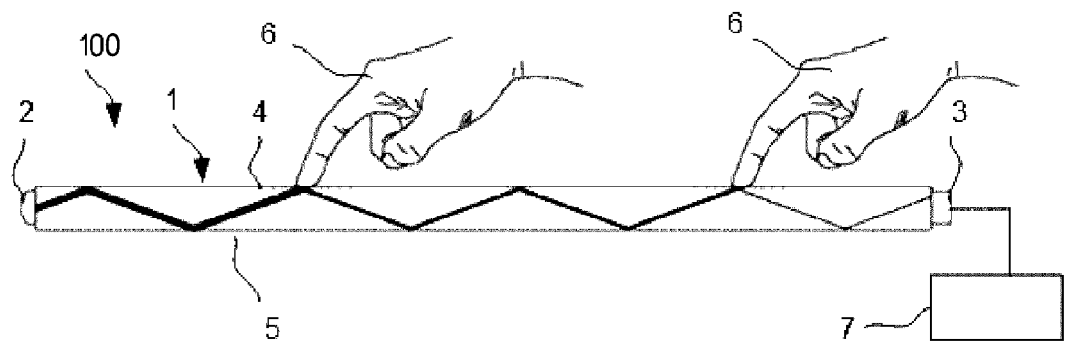
FIG. 1a and FIG. 1b are section and top plan views of an FTIR-based touch system of projection-type.

Before describing embodiments of the invention, a few definitions will be given.

A "touch object" or "touching object" is a physical object that touches, or is brought in sufficient proximity to, a touch surface so as to be detected by one or more sensors in the touch system. The physical object may be animate or inanimate.

An "interaction" occurs when the touch object affects a parameter measured by the sensor.

An "interaction strength" is a relative or absolute measure of the degree of interaction. The "interaction strength" may be represented as an "attenuation".

An "interaction map" or "interaction pattern" is a two-dimensional (2D) distribution of interaction strength across the touch surface, or a portion thereof. If the interaction is presented as attenuation, the interaction map/pattern is also denoted an "attenuation map" or "attenuation pattern".

A "touch" denotes a point of interaction as seen in the interaction pattern.

A "frame" or "iteration" denotes a repeated event starting with data collection and ending with determination of touch data.

As used herein, a "trace" is information about the temporal history of an interaction. Touches from an interaction detected in a sequence of frames, i.e. at different points in time, are collected into a trace.

Throughout the following description, the same reference numerals are used to identify corresponding elements.

The following detailed embodiments described are that of a FTIR optical touch system. However, it should be understood that the concepts discussed in the summary of the invention and claims can be applied to any other touch system types which perform touch detection in frames, including: resistive, surface acoustic wave, capacitive, surface capacitance, projected capacitance, above surface optical touch, dispersive signal technology and acoustic pulse recognition type touch systems.

Basic FTIR Touch Architecture

1. Touch-Sensitive Apparatus

Figure 1B:
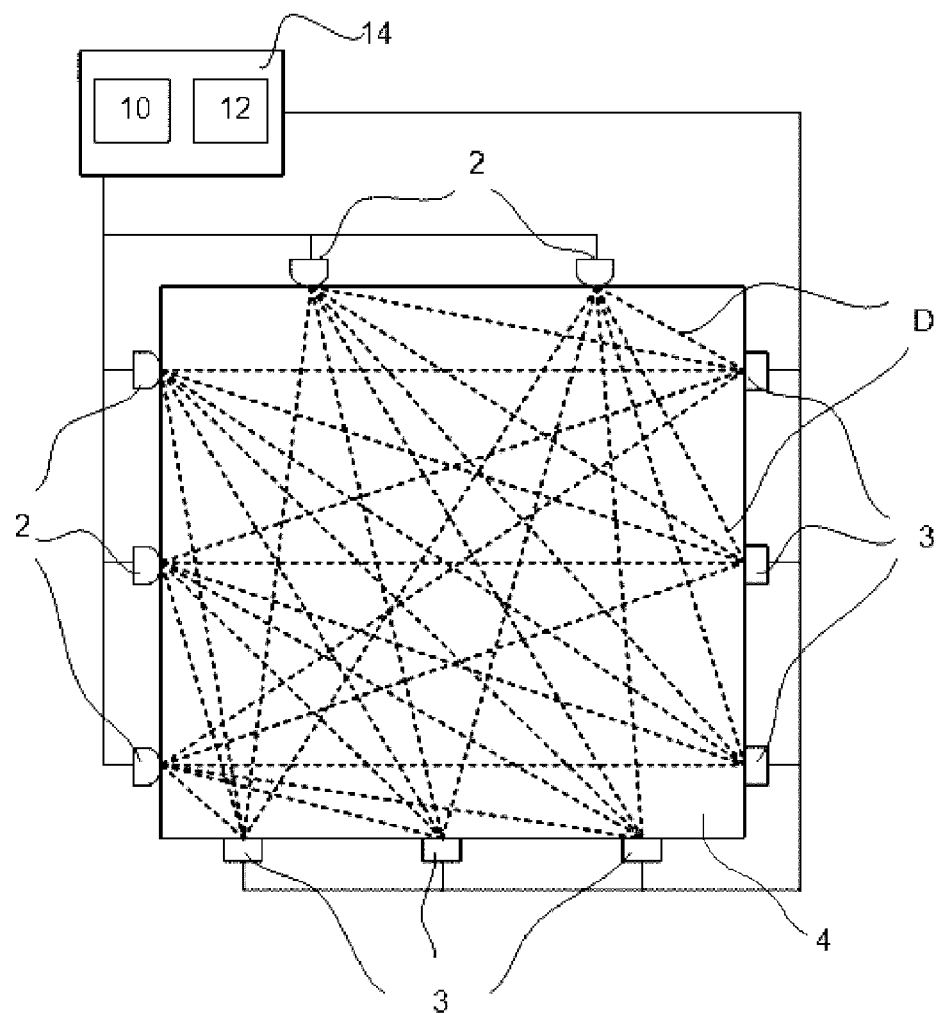

FIG. 1a and FIG. 1b illustrate an example embodiment of a touch-sensitive apparatus 100 that is based on the concept of FTIR (Frustrated Total Internal Reflection), also denoted "FTIR system". The apparatus operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1a, the propagation channel is defined between the boundary surfaces 4, 5 of the panel 1, where the top surface 4 allows the propagating light to interact with touching objects 6 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 5 or against a reflective coating thereon. It is also conceivable that the propagation channel is spaced from the bottom surface 5, e.g. if the panel comprises multiple layers of different materials.

The apparatus 100 may be designed to be overlaid on or integrated into a display device or monitor.

Physical Effect of FTIR

The apparatus 100 allows an object 6 that is brought into close vicinity of, or in contact with, the touch surface 4 to interact with the propagating light at the point of touch. In this interaction, part of the light may be scattered by the object 6, part of the light may be absorbed by the object 6, and part of the light may continue to propagate in its original direction across the panel 1. Thus, the touching object 6 causes a local frustration of the total internal reflection, which leads to a decrease in the energy (power/intensity) of the transmitted light, as indicated by the thinned lines downstream of the touching objects 6 in FIG. 1*a*.

Grid Pattern

The emitters 2 are distributed along the perimeter of the touch surface 4 to generate a corresponding number of light sheets inside the panel 1. In the example of FIG. 1*b*, each emitter 2 generates a beam of light that expands in the plane of the panel 1 while propagating in the panel 1. Each beam propagates from one or more entry or incoupling points on the panel 1. The sensors 3 are distributed along the perimeter of the touch surface 4 to receive the light from the emitters 2 at a number of spaced-apart outcoupling points on the panel 1. It should be understood that the incoupling and outcoupling points merely refer to the position where the beam enters and leaves, respectively, the panel 1. Thus, one emitter/sensor may be optically coupled to a number of incoupling/outcoupling points. In the example of FIG. 1*b*, however, the detection lines D are defined by individual emitter-sensor pairs.

The sensors 3 collectively provide an output signal, which is received and sampled by a signal processor 10. The output signal contains a number of sub-signals, also denoted "projection signals", each representing the energy of light emitted by a certain light emitter 2 and received by a certain light sensor 3. Depending on implementation, the signal processor 10 may need to process the output signal for separation of the individual projection signals. Conceptually, the touch apparatus 100 is considered to define a grid of detection lines D on the touch surface 4, where each detection line D corresponds to a light propagation path from an emitter 2 to a sensor 3, as projected onto the touch surface 4. Thus, the projection signals represent the received energy or power of light on the individual detection lines D. It is realized that the touching object 6 results in a decrease (attenuation) of the received energy on one or more detection lines D.

Signal Processing

As will be explained below, the signal processor 10 may be configured to process the projection signals so as to determine a distribution of signal strength values (for simplicity, referred to as an "touch surface pattern") across the touch surface 1, where each signal strength value represents a local attenuation of light. The touch surface pattern may be represented in many different ways, e.g. as signal strength values arranged in a regular x-y-grid, such as in an ordinary digital image, although other types of grids are conceivable, e.g. hexagonal patterns or triangular meshes.

In the illustrated example, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1*a* merely illustrates one example of an FTIR touch system. However, it should be understood that the concepts discussed in the summary of the invention and claims can be applied to any other FTIR touch system configuration as well as non-FTIR touch system types which perform touch detection in frames, including: resistive, surface acoustic wave, capacitive, surface capacitance, projected capacitance, above surface optical touch, dispersive signal technology and acoustic pulse recognition type touch systems.

2. Tracking

Figure 2:
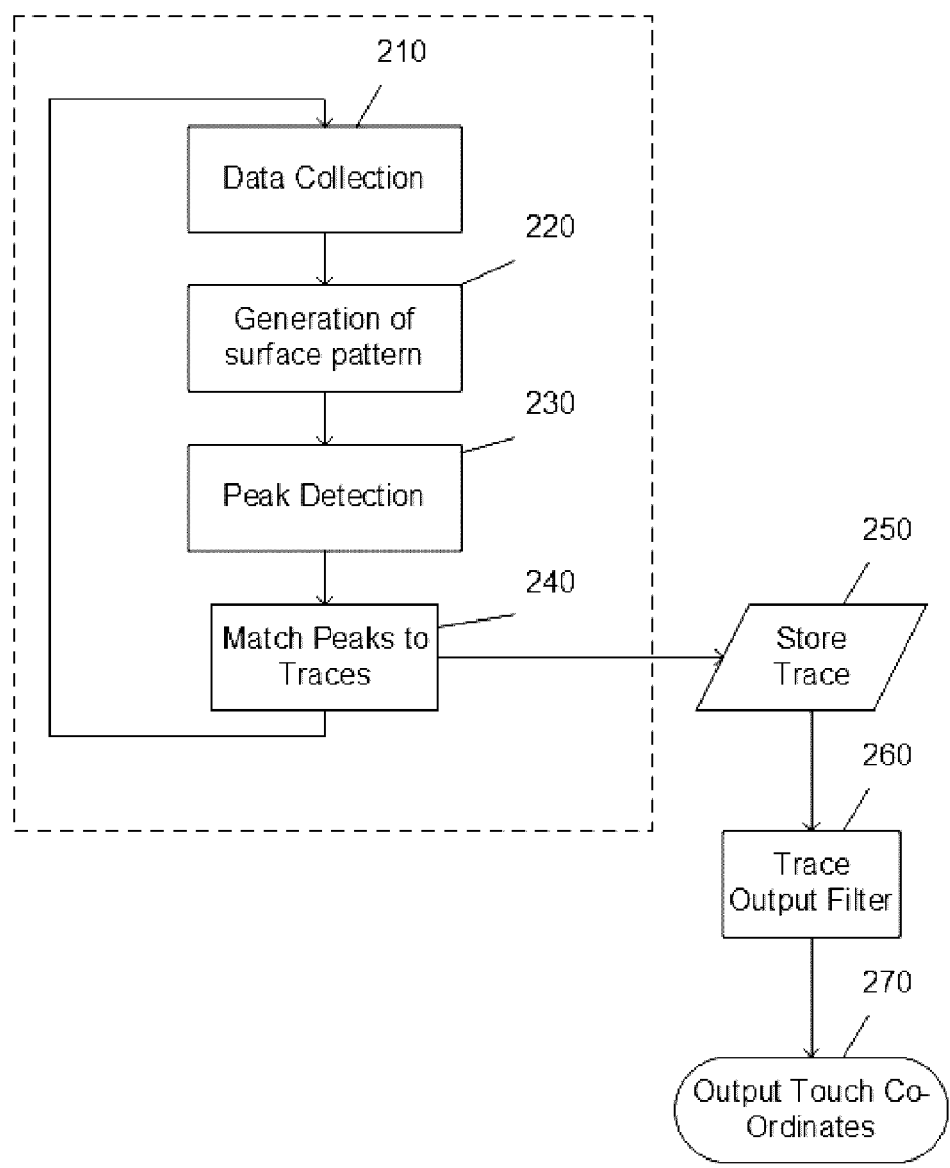
Figure 4A:
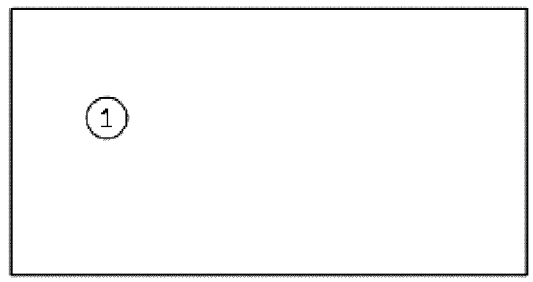
FIG. 4a to FIG. 4f are a top view of a touch system showing touch traces in a sequence of frames.
Figure 4B:
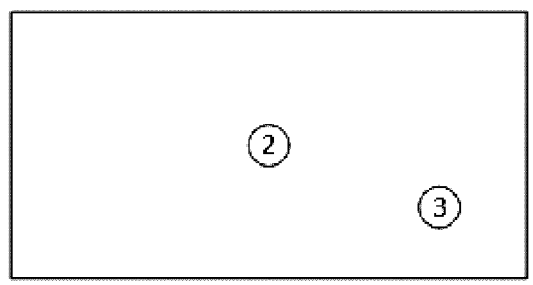
Figure 4C:
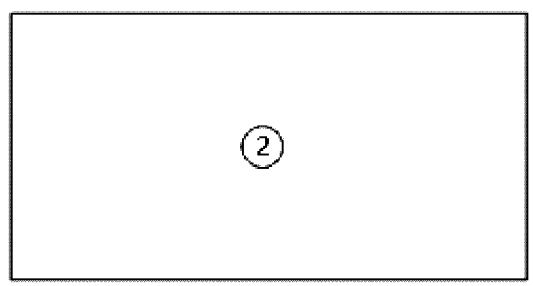
Figure 4D:
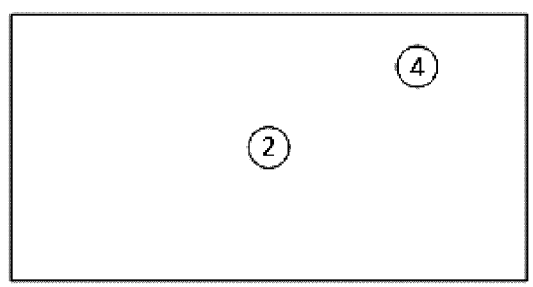
Figure 4E:
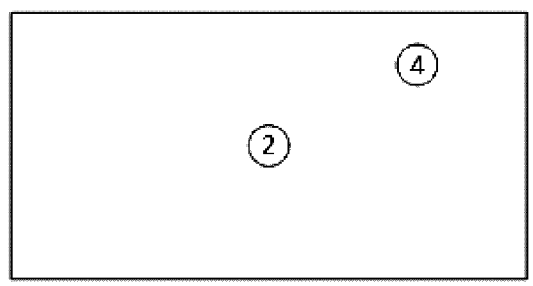
Figure 4F:
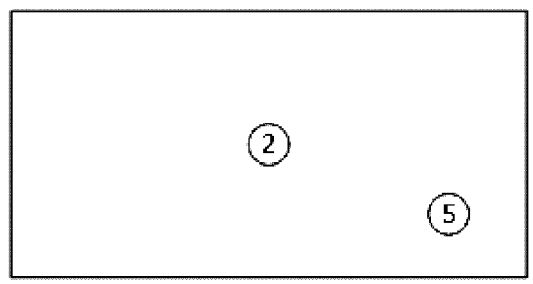

FIG. 2 is a flow chart of a data extraction process in a touch system. The process involves a sequence of steps 210-270 that are repeatedly executed, e.g. by the signal processor 10 (FIG. 1*b*). In the context of this description, each sequence of steps 210-270 is denoted a frame or iteration.

Pre-Processed Data

Each frame starts by a data collection step 210, in which touch signal values are obtained from sensors 3. The data collection step 210 may also include pre-processing of the measured values, e.g. filtering for noise reduction.

Reconstruction

In a reconstruction step 220, the touch signal values are processed for generation of a touch surface pattern. Reconstruction step 220 may also include processing of the touch surface pattern to reduce noise or compensate for the effects of surface contamination etc.

Peak Detection

In a peak detection step 230, the touch surface pattern is then processed for detection of peaks, e.g. using any known technique. In one embodiment, a global or local threshold is first applied to the touch surface pattern, to suppress noise. Any areas with signal values that fall above the threshold may be further processed to find local maxima. The identified maxima may be further processed for determination of a touch shape and a centre position, e.g. by fitting a two-dimensional second-order polynomial or a Gaussian bell shape to the signal values, or by finding the ellipse of inertia of the signal values. There are also numerous other techniques as is well known in the art, such as clustering algorithms, edge detection algorithms, standard blob detection, water shedding techniques, flood fill techniques, etc. Step 230 results in a collection of peak data, which may include values of position, signal size, and shape etc for each detected peak. The signal strength may be given by a maximum signal strength value or a weighted sum of signal strength values within the peak shape.

Peak Matching to Traces

In a matching step 240, the detected peaks are matched to existing traces, i.e. traces that were deemed to exist in the immediately preceding frame. If a detected peak cannot be matched to an existing trace, a new trace is generated for the peak with an age of zero. The matching step 240 may be based on well-known principles and will not be described in detail. For example, step 240 may operate to predict the most likely values of certain trace parameters (location, and possibly size and shape) for all existing traces and then match the predicted values of the trace parameters against corresponding parameter values in the peak data produced in the peak detection step 230. The prediction may be omitted. Step 240 results in "trace data", which is an updated record of existing traces, in which the trace parameter values of existing traces are updated based on the peak data. It is realized that the updating also includes deleting traces deemed not to exist (caused by an object being lifted from the touch surface, "touch up"), and adding new traces (caused by an object being put down on the touch surface, "touch down"). In step 250, the trace data is stored in a trace store.

Trace Output Filter

In output step 260, the trace output filter determines which traces in the trace store to output and which traces to suppress and outputs touch coordinates accordingly in step 270.

3. Trace

FIG. 3a shows an example of the properties of a trace. A trace is a data structure which represents the trajectory for an individual touching object on the touch surface as a function of time. Each trace has a global age, and may be associated with a plurality of other trace parameters, such as location, a size, a location history, a speed. An example of a trace structure is shown in FIG. 3a.

The "age" of a trace indicates how long the trace has existed, and may be given as a number of frames, the frame number of the earliest touch in the trace, a time period, etc.

The "confirmed" property indicates whether the trace has been previously output by the trace output filter as touch coordinates in step 270 of FIG. 2.

The signal strength, the location, and the area of the trace are given by the "Signal_Strength", "Location", and "Area", respectively, of the most recent touch in the trace.

The "speed" may be given as a velocity value or as a distance (which is implicitly related to a given time period). Any known technique for estimating the tangential speed of the trace may be used, taking any selection of recent locations into account. In yet another alternative, the "speed" may be given by the reciprocal of the time spent by the trace within a given region which is defined in relation to the trace in the touch surface pattern. The region may have a pre-defined extent or be measured in the touch surface pattern, e.g. given by the extent of the peak in the touch surface pattern.

Each property of the trace may also include historical values recorded since the trace was initiated. For example, the location variable may also contain values for the "location history" of at least part of the spatial extension of the trace across the touch surface, e.g. given as the locations of the latest few touches in the trace, or the locations of all touches in the trace, a curve approximating the shape of the trace, or a Kalman filter.

The "Area" of a trace may be determined by recording the number of continuous pixels which exceed a noise threshold in at the location of the trace. The area of the trace may also be calculated via a number of alternative methods, such as FIG. 3b shows an example of global properties for the touch system. The "Number_Of_confirmed_traces" indicates the number of traces for which the system is outputting touch data. "Number_Of_traces" indicates the number of traces which the system is tracking, regardless of whether they are confirmed or not. The "Global_noise" variable is an indication of the estimated noise in the system. Global noise of an optical or electrical touch system may be calculated in a number of ways familiar to those skilled in the art.

4. Trace Output Filter

Each trace maintained by the system represents a possible touch. However, some of the traces may represent false positives whilst some may represent legitimate touches. The function of the trace output filter is to quarantine traces until a level of confidence is reached that the trace represents a real touch. Sometimes the level of confidence is reached immediately and the trace can be output as a confirmed touch without being quarantined at all. Sometimes the trace will remain in quarantine for the duration of its existence without ever being output as a confirmed touch.

FIG. 4a to FIG. 4f and FIG. 5 show the consequences of using a fixed number of quarantine frames to quarantine traces before outputting them as confirmed touches. FIG. 4a to FIG. 4f shows traces (1) to (5) and their appearance in consecutive frames 4a-4f.

FIG. 5 shows the confirmed traces output by the trace output filter when a specific number of quarantine frames are used for each trace. Where no quarantine frames are used, each of touches (1) to (5) are output. Given that some of the traces only appear for a single frame, they are likely to be false positive touches which should actually be suppressed. Where just one quarantine frame is used, we see an immediate improvement in the number of false positive touches. However, touch (4) is still output, despite only appearing for a couple of frames. When 2 quarantine frames are used, all the potential false positives are removed and just touch (2) is preserved. However, touch (2) is now only output as a confirmed touch after a latency of two frames. When 3 quarantine frames are used, no further noise reduction is achieved but touch (2) is now output with a latency of 3 frames, which may be unsuitable.

In order to avoid the above latency/noise problems, the touch output filter determines a number of quarantine frames for each trace on an individual basis. As described below, this is implemented by the touch output filter by determining, in each frame, an age which the trace must reach before being output as a confirmed touch.

Figure 6:
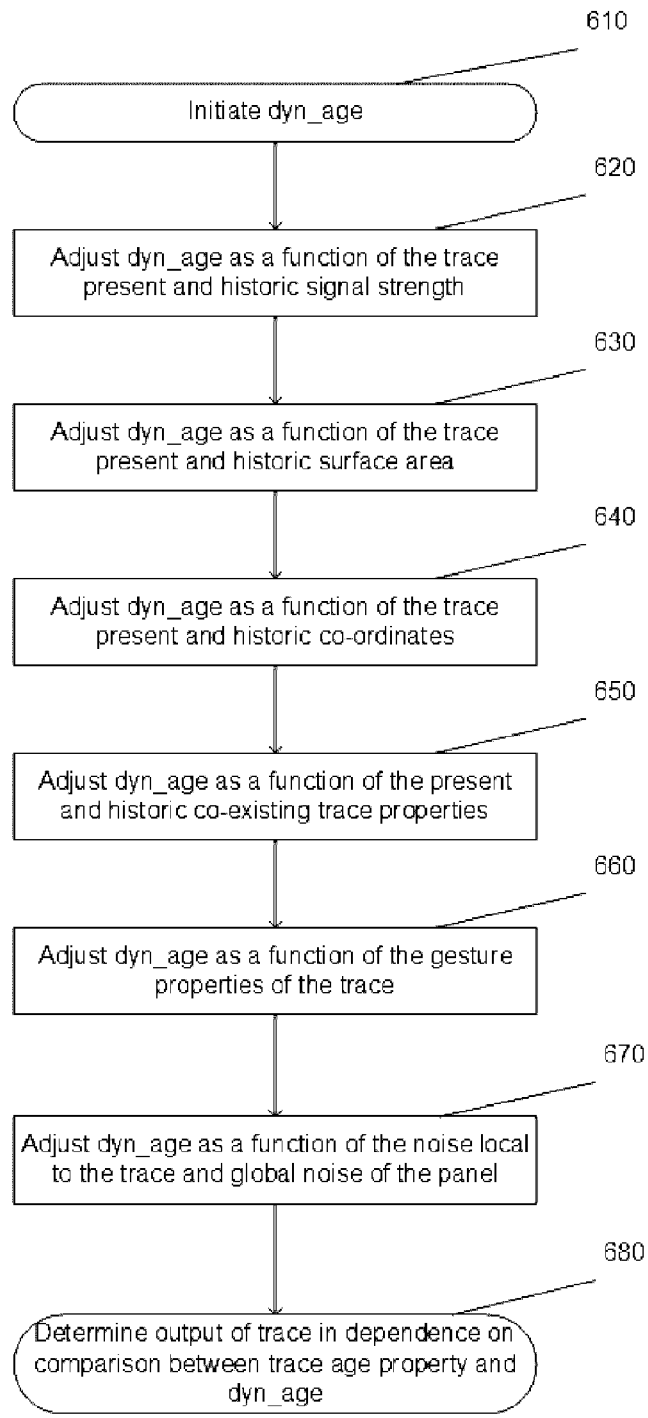
FIG. 6 is an embodiment of a touch output filter process flow.
Figure 7A:
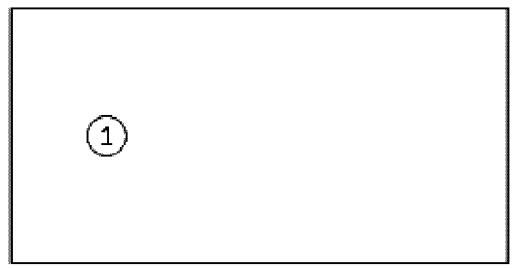
FIG. 7a to FIG. 7f are a top view of a touch system showing touch traces with different areas in a sequence of frames.
Figure 7B:
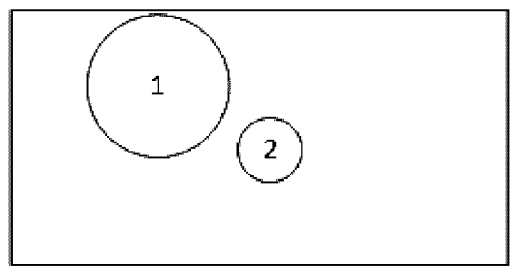
Figure 7C:
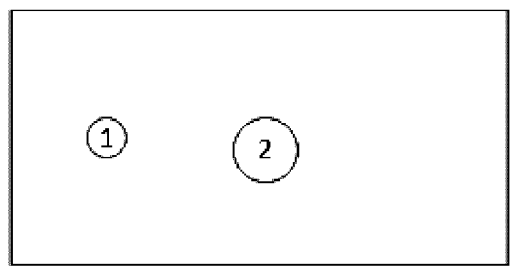
Figure 7D:
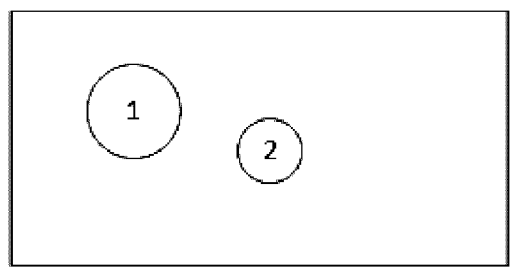
Figure 7E:
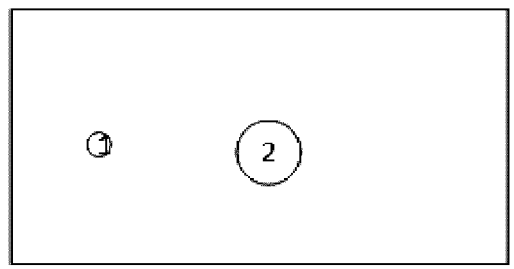
Figure 7F:
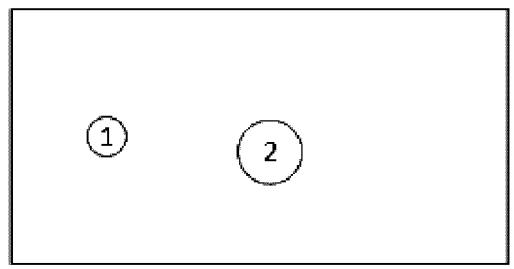

FIG. 6 shows an embodiment of the invention in which a heuristic process is used for determining which traces to output as confirmed touches. Each of steps 620-670 are optional steps and may or may not be included, depending on the needs of the system designer.

In step 610 of FIG. 6, the touch output filter initiates a "dyn_age" variable. This variable is an integer indicating the number of frames for which the trace should be quarantined and will eventually be compared with the global age of the trace (also measured in frames) being analysed by the trace output filter in order to determine whether the trace should be output as a confirmed touch. As the process shown in FIG. 6 proceeds, dyn_age is adjusted in dependence on the properties of the trace and the properties the environment (i.e. the panel). This allows number of frames for which the trace is quarantined to be adjusted in dependence on the properties of the frame and the properties of the environment.

Signal Strength

In step 620, dyn_age is adjusted as a function of the signal strength of the trace. This allows the number of quarantine frames to be adjusted in dependence on the measured signal strength of the trace, as high signal strength is usually a good indicator of a real touch. Signal strength in an FTIR touch system would be calculated as a function of the attenuation of the light signals propagating through the panel. dyn_age can be reduced in proportion to the strength of the signal. Preferably, dyn_age can be reset to 0 once the signal strength of the trace is above a threshold that could normally be associated with noise.

Preferably, dyn_age is also adjusted in dependence on the historical trend of the signal strength of the trace. If the trace has a consistent strength value over a number of frames preceding the present frame, this may indicate a physical touch rather than a noise effect and dyn_age may be reduced in order reduce the latency in confirming the trace.

In one embodiment, a weighted average of previous signal strengths is calculated and measured against a noise threshold to determine the likelihood of the trace being a real touch. Where the weighted average exceeds the noise threshold, the dyn_age is decreased accordingly.

Peak Area

In step 630 of FIG. 6, dyn_age is adjusted as a function of the surface area of the trace. This allows the number of quarantine frames to be adjusted in dependence on the size of the trace surface area.

A trace having a surface area exceeding a specific size is unlikely to represent a single finger point and may instead represent a resting palm on the surface of the touch panel. Preferably therefore, a trace having a surface area exceeding a threshold should result in a dyn_age sufficiently large to prevent confirmation of the trace at any point.

Furthermore, a trace having a surface area insufficiently large to represent a finger point might also indicate noise rather than a real touch. Therefore, dyn_age may be increased accordingly.

FIG. 7a to FIG. 7f shows a sequence of frames containing traces with varying surface area. Preferably, dyn_age is also adjusted in dependence on the historical trend of the area of the trace. If the trace has a consistent surface area across a number of frames preceding the present frame, this may indicate a physical touch rather than a noise effect and dyn_age may be reduced in order to reduce the latency in confirming the trace. In FIG. 7a to FIG. 7f, trace (1) would have a significantly higher dyn_age than trace (2). The result would be that the trace output filter would output trace (2) earlier than trace (1).

Location

In step 640 of FIG. 6, dyn_age is adjusted as a function of the location of the trace. This allows the number of quarantine frames to be adjusted in dependence on the location of the trace on the surface of the panel.

For traces which are located in areas of the touch panel more susceptible to noise, dyn_age may be increased.

Figure 8A:
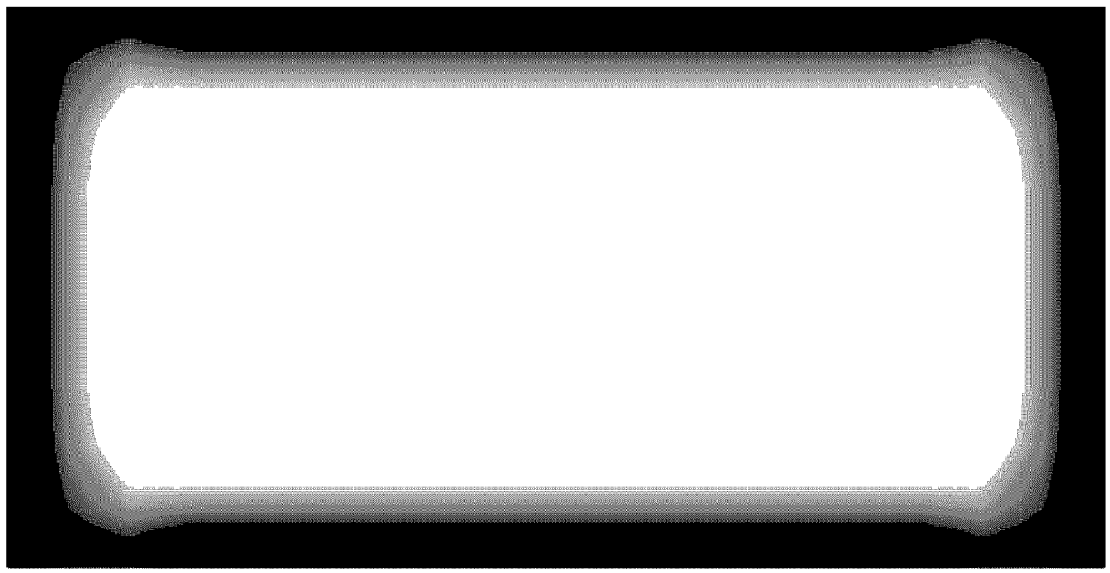
FIG. 8a shows a top view of a touch system have greater noise around the perimeter of the touch surface.
Figure 8B:
FIG. 8b shows a top view of a touch system have greater noise around the centre of the touch surface.

FIG. 8a and FIG. 8b shows noise in various types of touch surface systems. In one embodiment, dyn_age is increased for traces which are located at the edges of the touch surface and decreased for traces which are located at the centre of the touch surface. This reduces false positives for systems, shown in FIG. 8a, having high noise (shown as a shaded area) around the perimeter of the touch surface (e.g. FTIR touch systems). In an alternative embodiment, dyn_age is decreased for traces which are located at the edges of the touch surface and increased for traces which are located at the centre of the touch surface. This reduces false positives for systems, shown in FIG. 8b, having high noise around the centre of the touch surface (e.g. projected capacitance systems).

Zones or Coordinate

Figure 9A:
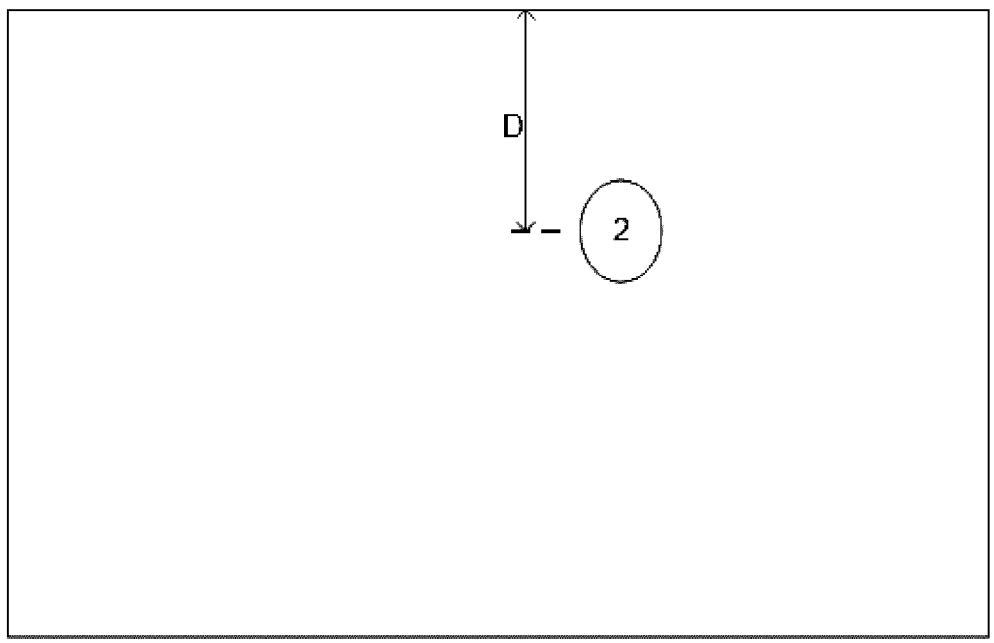
FIG. 9a shows a measured distance of a touch trace from an edge of a touch surface.

FIG. 9a shows an embodiment of the invention in which dyn_age of trace (2) is adjusted according to a function of the shortest distance from the trace to an edge of the panel.

Figure 9B:
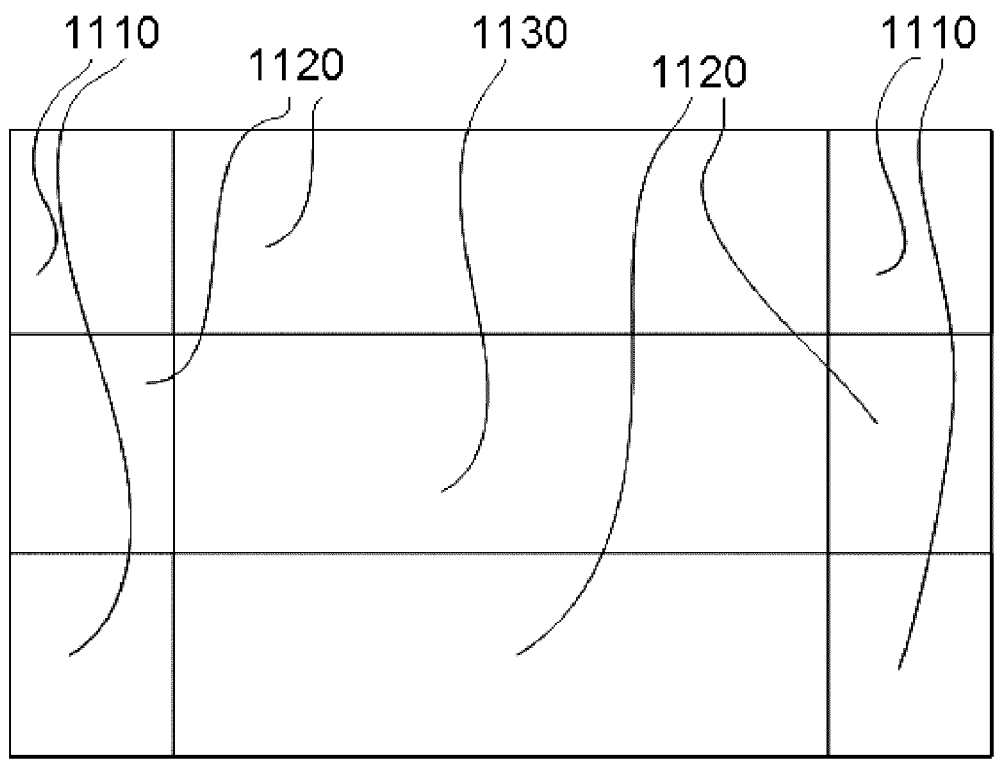
FIG. 9b shows a top view of a touch system having predefined zones.

FIG. 9b shows an embodiment of the invention in which a number of pre-calculated or dynamically calculated spatial zones are used to determine an adjustment to dyn_age.

In an example of the embodiment of FIG. 9a, dyn_age of trace (2) may be incremented by 1 where the trace is within a predetermined distance from the first edge of the panel (e.g. 1 cm). Otherwise, dyn_age is not incremented.

In an example of the embodiment of FIG. 9b, dyn_age of a trace may be incremented by 0 where the trace is within zones 1130 of the panel, incremented by 1 where the trace is within zones 1120, and incremented by 1 where the trace is within zones 1110.

Other Traces

In step 650 of FIG. 6, dyn_age is adjusted as a function of the properties of other presently existing traces. This allows the number of quarantine frames to be adjusted in dependence on the effect that other traces might have on the present trace or the touch panel environment.

Closeness to Other Traces

Figure 10A:
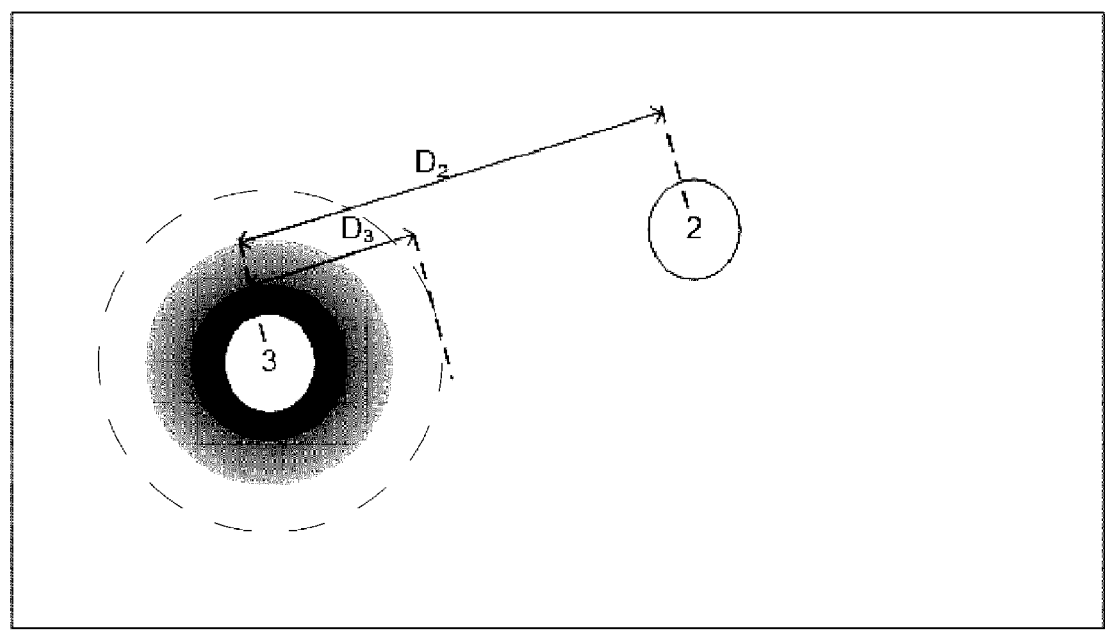
FIG. 10a shows a method for measuring distance of a touch trace from other touch traces/confirmed touches.

FIG. 10a shows an embodiment of the invention in which dyn_age is adjusted according to a function of the distance from the trace to the closest existing confirmed touch. Existing touches can add a degree of signal noise to touch systems (shown as a shaded area), especially in their vicinity on the touch surface. In the embodiment shown, the dyn_age of trace (2) is only adjusted when trace (2) is determined to fall within a region of noise caused by trace (3). This would be when trace (2) is at a distance D2 equal or less than D3.

Figure 10B:
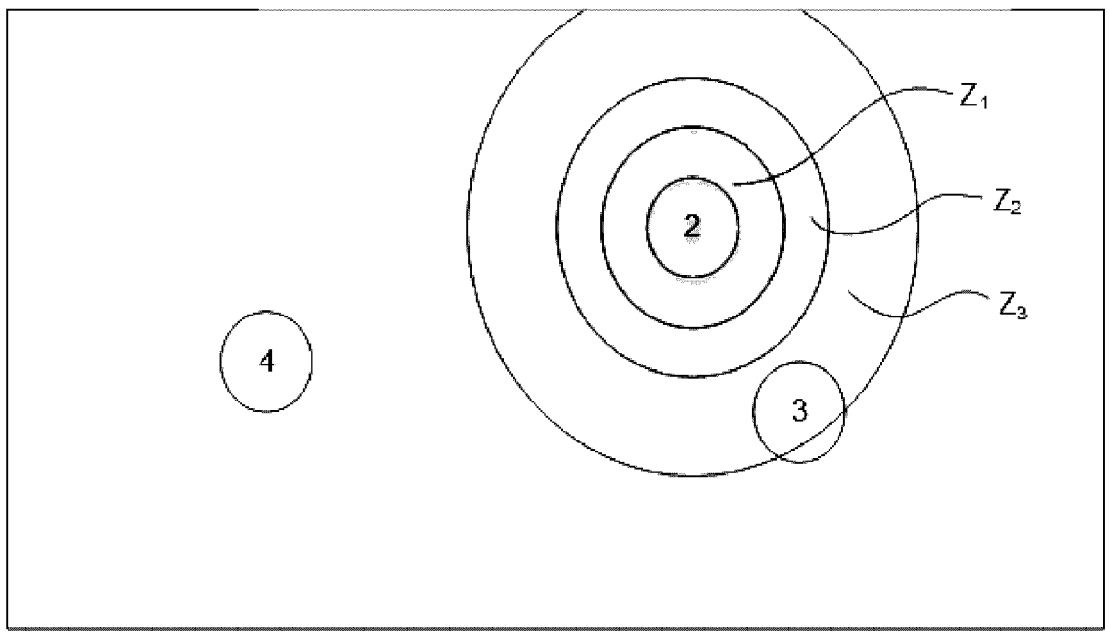
FIG. 10b shows a top view of a touch system having predefined zones around each confirmed touch.

FIG. 10b shows an embodiment of the invention similar to that shown in FIG. 10a in which a number of spatial zones around trace (2) are used to determine an adjustment to dyn_age. If a nearby trace falls within a distance of trace (2), a corresponding adjustment to dyn_age is made in dependence on which zone the nearby trace resides in.

In an example of the embodiment of FIG. 10a, dyn_age may be incremented by 1 where trace (2) is within a predetermined distance of trace (3) (e.g. 2 cm). Otherwise, dyn_age is not incremented.

In an example of the embodiment of FIG. 10b, dyn_age of trace (1) may be incremented by 0 where the trace lies outside zones $Z_1$, $Z_2$, and $Z_3$, incremented by 1 where the trace is within zone $Z_3$, incremented by 2 where the trace is within zone $Z_2$, and incremented by 3 where the trace is within zone $Z_1$.

Global Number of Touches

In one embodiment, values representing the number of presently existing traces, the number of presently existing confirmed traces, and the amount of global noise, are stored in the trace store. The number of existing confirmed traces describes the number of presently existing traces which have been confirmed and output by the touch output filter. It is important to monitor this value as a distinct value to the number of traces as real touches (which confirmed traces are assumed to represent) may generate noise. False positive touches (which unconfirmed traces are assumed to represent until being confirmed) are the product of noise and may not generate noise themselves.

Figure 11A:
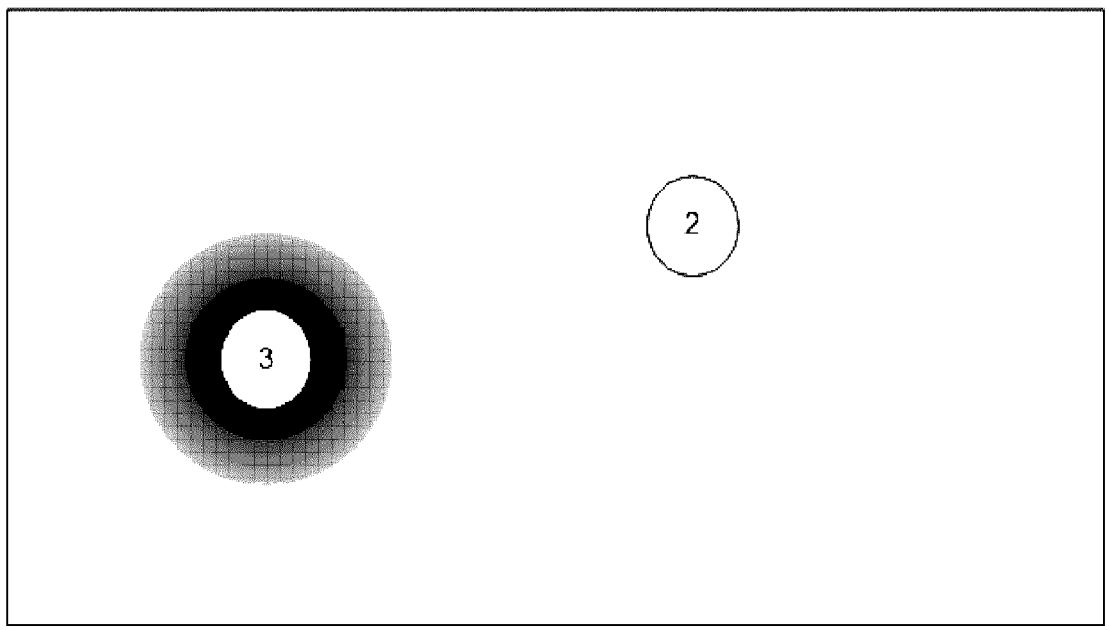
FIG. 11a shows a model of the noise around a confirmed touch.

FIG. 11a shows an example of expected noise (shown as a shaded area) from a single confirmed trace (3) in one embodiment. As the amount of global noise is low and trace (2) is relatively isolated, dyn_age can be reduced to improve touch latency.

Figure 11B:
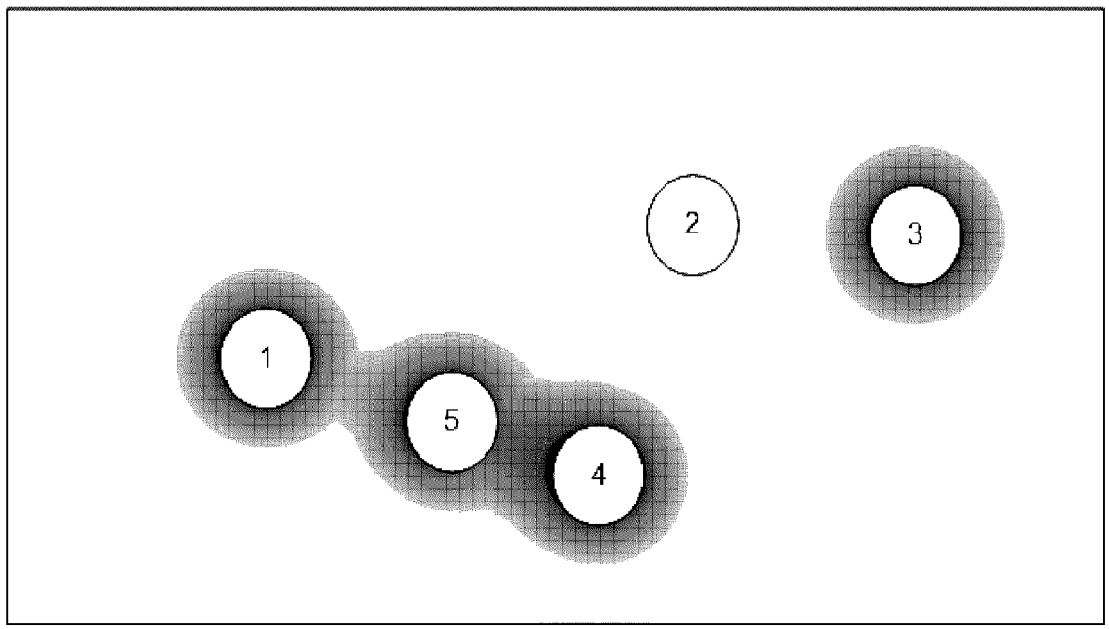
FIG. 11b shows the total noise in the touch system when multiple confirmed touches exist at the same time.

FIG. 11b shows a scenario in which the number of confirmed traces is high, resulting in a large amount of global noise. An embodiment of the invention may increase dyn_age of each unconfirmed trace in order to reduce the possibility of a false positive resulting from the increased global noise. In one embodiment, dyn_age is increased by a number of frames proportional to the total number of confirmed traces in the current frame.

Speed

In one embodiment, dyn_age is adjusted as a function of the determined speed or direction of the trace. Where the position of the trace has been determined to be changing by large distances per frame, the speed of the trace is assumed to be high. As these large differences may be a consequence of noise from the system, an unconfirmed trace apparently travelling at high speed has a large risk of being a false touch. Therefore, in one embodiment of the invention, dyn_age is incremented when the speed of the trace exceeds a threshold value. Where the trace exceeds a speed which is possible from a human operator, the dyn_age is increased further, effectively preventing the trace from being output as a touch until it is within more reasonably limits.

Gestures

In step 660 of FIG. 6, dyn_age is adjusted as a function of the properties of the identified gesture associated with the trace. This allows the number of quarantine frames to be adjusted in dependence on the expected behaviour of the gesture.

Figure 12:
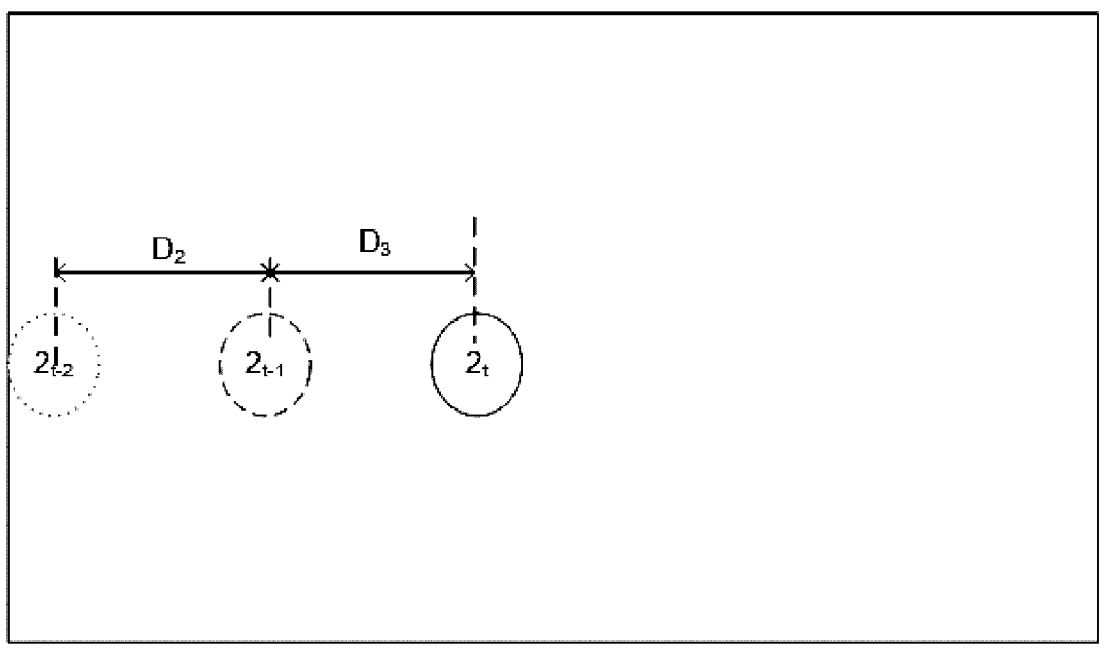
FIG. 12 shows a swipe gesture from the left edge of the touch surface.

FIG. 12 shows a gesture called an 'edge swipe'. This is a gesture where the user drags a finger from an edge of the display panel towards the centre of the panel. In some cases, the gesture may begin outside the active area of the display. In an embodiment where a trace is determined to part of an edge swipe gesture, dyn_age is reduced in order to improve the latency of the trace.

Global Noise

In step 670 of FIG. 6, dyn_age is adjusted as a function of the environmental properties of the touch panel, such as a measured global noise. This allows the number of quarantine frames to be adjusted in dependence on the general or specific types of noise that the touch panel is subjected to, such as electrical or optical noise from the environment in which the touch panel is being used.

In one embodiment, dyn_age is adjusted as a function of a border noise value. Certain types of noise have a particularly strong effect on touch coordinates close to the edge of the screen. In a touch apparatus employing optical emitters and detectors around the edge of a touch surface and which generates a reconstructed image of the touch surface for determining touch interaction, ambient noise will have a particularly strong effect on the borders of the reconstructed image close to the corresponding physical location of the emitters. Also in this type of system, reconstruction artefacts manifest most strongly at the edges of the image. Consequently, an embodiment is provided wherein dyn_age is adjusted according to a noise value determined from pixel values of pixels within a border region of the reconstructed value. In one specific example shown in FIG. 13, dyn_age border is dependent on or proportional to x, wherein:

$$x^2 = \frac{\sum_{i=0}^{i<E}\left(\overbrace{\sum_{k=0}^{k<N-E}(I(i,k))^2}^{I} + \overbrace{\sum_{k=E}^{k<N}(I(M-i-1,k))^2}^{II} + \overbrace{\sum_{k=E}^{k<M}(I(i,k))^2}^{III} + \overbrace{\sum_{k=0}^{k<M-E}(I(k,N-i-1))^2}^{IV}\right)}{z}$$

Figure 13:
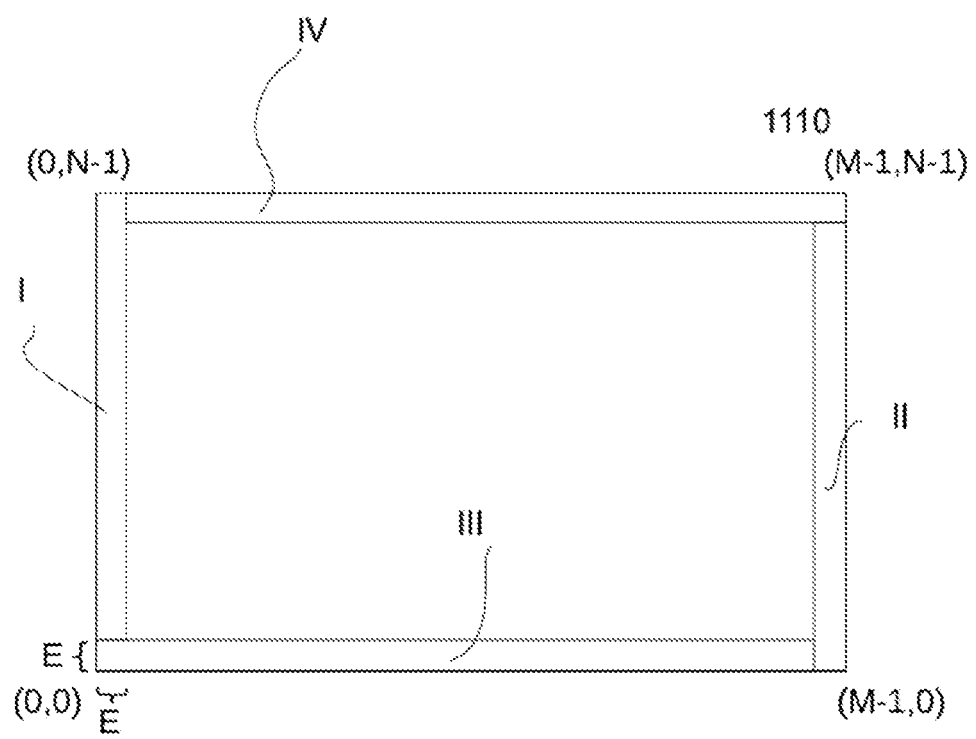
FIG. 13 shows a top view of a touch system having predefined border zones.

In the above equation, the numbered sums correspond to the area of pixels in each marked region of FIG. 13. I is the image matrix of the reconstructed image and I(x,y) is a value of at location x,y in the matrix. E is the number of edge columns/rows to be used for each region. z is the total number of pixels used.

Alternative methods are envisaged for determining an average noise value for pixels in a border region of the reconstructed image, including the use of standard statistical methods known in the art.

It is envisioned that the above steps maybe performed in any order. Furthermore, some adjustments to the dyn_age variable may be dependent on a function of multiple variables at once.

In an alternative embodiment to that of the embodiments above, the trace output filter calculates the "dyn_age" as a single linear or non-linear function of the multiple values stored in the trace data structure rather than calculating it in a heuristic manner.

In step 680 of FIG. 6, the trace output filter compares the dyn_age value to the trace_age variable of the trace. If dyn_age is greater than the trace_age, this indicates that the trace output filter has determined that the trace has not existed long enough to be output as a confirmed trace given the trace properties and environmental properties. If dyn_age is equal to or less than the trace_age, the trace has persisted through the quarantine frames and is output as a confirmed trace by the trace output filter. This will result in a touch output signal from the system.

It should also be appreciated that features disclosed in the foregoing description, and/or in the foregoing drawings and/or following claims both separately and in any combination thereof, be material for realizing the present invention in diverse forms thereof. When used in the following claims, the terms "comprise", "include", "have" and their conjugates mean, "including but not limited to".

The present invention has been described above with reference to specific embodiments. However, other embodiments than the above described are equally possible within the scope of the invention. Different method steps than those described above may be provided within the scope of the invention. The different features and steps of the invention may be combined in other combinations than those described. The scope of the invention is only limited by the appended patent claims.

The invention claimed is:

1. A method of determining touch of one or more objects on a touch surface of a touch-sensitive apparatus, the method comprises:
    storing a plurality of detected touch traces including a first touch trace and second touch trace, said first touch trace comprising one or more first touch characteristics and said second touch trace comprising one or more second touch characteristics;
    for the first stored touch trace, determining a first number of consecutive frames to wait to output a confirmed first touch signal corresponding to the first touch trace based on the one or more first touch characteristics;
    for the second touch trace, determining a second number of consecutive frames to wait to output a confirmed second touch signal corresponding to the second touch trace based on the one or more second touch characteristics wherein the second number of consecutive frames are different to the first number of consecutive frames;
    outputting the confirmed first touch signal corresponding to the first touch trace after the first number of consecutive frames have elapsed, wherein the confirmed first touch signal has a first latency; and
    outputting the confirmed second touch signal corresponding to the second touch trace after the second number of consecutive frames have elapsed, wherein the confirmed second touch signal has a second latency,
    wherein said determination of the first number of consecutive frames and said determination of the second number of consecutive frames is performed on an individual basis to reduce latency.

2. The method of claim 1, wherein said one or more characteristics may comprise a touch trace signal strength.

3. The method of claim 2, wherein the touch trace signal strength corresponds to a touch trace size.

4. The method of claim 3, wherein the touch trace size is dependent on the number of pixels exceeding a noise threshold in a vicinity of a location of the touch trace on the touch surface.

5. A non-transitory, tangible computer readable storage medium comprising computer instructions which, when executed by a data-processing system, are configured to carry out the method of claim 1.

6. The method of claim 1, wherein said one or more characteristics comprise at least one of a touch trace signal strength, a location of the touch trace on the touch surface, a total number of touch traces, a total number of confirmed traces in the current frame, a direction of the touch trace, a speed of the touch trace, a gesture type, and a noise value.

* * * * *